(12) United States Patent
Karmakar et al.

(10) Patent No.: US 11,907,998 B2
(45) Date of Patent: *Feb. 20, 2024

(54) SYSTEM AND METHOD FOR COUPLING A USER COMPUTING DEVICE AND A POINT OF SALE DEVICE

(71) Applicant: Walmart Apollo, LLC, Bentonville, AR (US)

(72) Inventors: Anirvan Karmakar, Bangalore (IN); Sreenu Valeti, Bangalore (IN); Sreejith Sreedharan, Bangalore (IN); Ananda Pillareddy, Bangalore (IN)

(73) Assignee: Walmart Apollo, LLC, Bentonville, AR (US)

( * ) Notice: Subject to any disclaimer, the term of this patent is extended or adjusted under 35 U.S.C. 154(b) by 27 days.

This patent is subject to a terminal disclaimer.

(21) Appl. No.: 17/585,052

(22) Filed: Jan. 26, 2022

(65) Prior Publication Data

US 2022/0148068 A1 May 12, 2022

Related U.S. Application Data

(63) Continuation of application No. 16/050,026, filed on Jul. 31, 2018, now Pat. No. 11,263,682, which is a
(Continued)

(51) Int. Cl.
*G06Q 30/0601* (2023.01)
*G06Q 20/32* (2012.01)

(52) U.S. Cl.
CPC ..... *G06Q 30/0631* (2013.01); *G06Q 20/3276* (2013.01); *G06Q 30/0633* (2013.01)

(58) Field of Classification Search
CPC .......... G06Q 30/0631; G06Q 20/3276; G06Q 30/0633
See application file for complete search history.

(56) References Cited

U.S. PATENT DOCUMENTS 6,876,977 B1  4/2005  Marks
7,725,362 B2  5/2010  Weathers, Jr.
(Continued)

FOREIGN PATENT DOCUMENTS

EP       1170690 A1    1/2002
WO   2012172568 A1   12/2021

OTHER PUBLICATIONS

J. -S. Yih, F. Pinel, Y. -H. Liu and T. Chieu, "Pervasive computing technologies for retail in-store shopping," ICPS '05. Proceedings. International Conference on Pervasive Services, 2005., Santorini, Greece, 2005, pp. 111-116, doi: 10.1109/PERSER.2005.1506399 (Year: 2005).*

(Continued)

*Primary Examiner* — Michelle T Kringen
(74) *Attorney, Agent, or Firm* — Fitch, Even, Tabin & Flannery LLP

(57) ABSTRACT

In some embodiments, purchase systems and methods are provided. Some embodiments comprise one or more processors configured to receive, at a point of sale device, a request to use self-checkout through a user computing device; couple the point of sale device with the user computing device by: display by the point of sale device a coupling code configured to be scanned by the user computing device; receive the coupling code by a server system; and interpret, at the server system, the coupling code to identify the point of sale device; cause contents of an electronic shopping cart associated with a transaction to be transmitted to the identified point of sale device; receive a customer identifier associated with the transaction; and conclude, on the point of sale device, the transaction based on the coupling of the point of sale device with the user computing device.

20 Claims, 6 Drawing Sheets

Related U.S. Application Data continuation of application No. 14/098,318, filed on Dec. 5, 2013, now Pat. No. 10,068,276.

(56) References Cited

U.S. PATENT DOCUMENTS

| | | | |
|---|---|---|---|
| 7,970,661 B1 | 6/2011 | Abraham | |
| 8,355,711 B2 | 1/2013 | Heins | |
| 8,417,572 B1 | 4/2013 | Chenault | |
| 8,583,512 B1* | 11/2013 | Gupta | G06Q 30/06 705/26.1 |
| 8,682,973 B2 | 3/2014 | Kikin-Gil | |
| 9,033,217 B2 | 5/2015 | Williams | |
| 10,068,276 B2 | 9/2018 | Karmakar | |
| 11,263,682 B2 | 3/2022 | Karmakar | |
| 2002/0143593 A1 | 10/2002 | Takata | |
| 2005/0075940 A1 | 4/2005 | Deangelis | |
| 2006/0149626 A1 | 7/2006 | Bennett | |
| 2006/0283941 A1 | 12/2006 | Singer-Harter | |
| 2007/0239552 A1 | 10/2007 | Sundaresan | |
| 2008/0059341 A1 | 3/2008 | Narayanaswami | |
| 2008/0177641 A1 | 7/2008 | Herniak | |
| 2010/0030578 A1 | 2/2010 | Siddique | |
| 2010/0030624 A1 | 2/2010 | Vaenskae et al. | |
| 2010/0082419 A1 | 4/2010 | Au-Yeung | |
| 2010/0185504 A1 | 7/2010 | Rajan | |
| 2010/0293474 A1 | 11/2010 | York | |
| 2010/0299616 A1 | 11/2010 | Chen | |
| 2011/0106655 A1 | 5/2011 | Kreiner | |
| 2012/0072304 A1 | 3/2012 | Homan | |
| 2012/0095853 A1* | 4/2012 | von Bose | G06Q 20/20 705/16 |
| 2012/0185355 A1 | 7/2012 | Kilroy | |
| 2012/0203605 A1* | 8/2012 | Morgan | G06Q 20/3223 705/14.51 |
| 2012/0209749 A1 | 8/2012 | Hammad | |
| 2012/0253972 A1 | 10/2012 | Oskolkov | |
| 2013/0013438 A1 | 1/2013 | Chen | |
| 2013/0054328 A1 | 2/2013 | Chavie | |
| 2013/0117378 A1 | 5/2013 | Kotorov | |
| 2013/0132220 A1 | 5/2013 | Baum | |
| 2013/0211953 A1 | 8/2013 | Abraham | |
| 2013/0268331 A1 | 10/2013 | Bitz | |
| 2013/0282581 A1 | 10/2013 | Singh | |
| 2013/0335273 A1 | 12/2013 | Pakzad | |
| 2014/0108178 A1 | 4/2014 | Cao | |
| 2014/0214564 A1 | 7/2014 | Argue | |
| 2016/0005019 A1 | 1/2016 | Paulo Rodrigues | |
| 2016/0342993 A1 | 11/2016 | Morgan | |
| 2017/0161720 A1 | 6/2017 | Xing | |
| 2017/0161735 A1 | 6/2017 | Ortiz | |

OTHER PUBLICATIONS

PCT; App. No. PCT/US2014/068638; International Search Report and Written Opinion dated Mar. 6, 2015; pp. 5.

P. Urien and S. Piramuthu, "Framework and authentication protocols forsmartphone, NFC, and RFID in retail transactions," 2013 IEEE Eighth International Conference on Intelligent Sensors, Sensor Networks and Information Processing, Melbourne, VIC, Australia, 2013, pp. 77-82, doi: 10.1109/ISSNIP.2013. (Year: 2013).

Examination Report in GB Patent Application No. GB1609525.9, dated Aug. 10, 2020; 7 pages.

Office Action in Canadian Patent Application No. 2,932,195 dated Dec. 14, 2018; 3 pages.

Office Action in Canadian Patent Application No. 2,932,195, dated Feb. 1, 2018; 3 pages.

Office Action in counterpart Canadian Patent Application No. 2,932,195 dated Mar. 10, 2017; 6 pages.

Dragt, B. "Universal Commerce: A seamless, Personalized Purchase Experince for Today's Connected Consumers," 2012.

Non-Final Office Action in U.S. Appl. No. 14/098,318, dated Jan. 16, 2015; 15 pages.

Final Office Action in U.S. Appl. No. 14/098,318, dated Jun. 29, 2015; 20 pages.

Non-Final Office Action in U.S. Appl. No. 14/098,318, dated Dec. 4, 2015; 33 pages.

Non-Final Office Action in U.S. Appl. No. 14/098,318, dated Apr. 22, 2016; 29 pages.

Final Office Action in U.S. Appl. No. 14/098,318, dated Nov. 2, 2016; 38 pages.

Non-Final Office Action in U.S. Appl. No. 14/098,318, dated Sep. 11, 2017; 53 pages.

Notice of Allowance in U.S. Appl. No. 14/098,318, dated May 1, 2018; 23 pages.

U.S. Appl. No. 16/050,026; Notice of Allowance dated Oct. 25, 2021; (pp. 1-9).

U.S. Appl. No. 16/050,026; Non-Final Office Action dated Mar. 31, 2021; (pp. 1-12).

U.S. Appl. No. 16/050,026; Final Office Action dated Jul. 23, 2020; (pp. 1-29).

U.S. Appl. No. 16/050,026; Non-Final Office Action dated Jan. 10, 2020; (pp. 1-29).

* cited by examiner

SYSTEM AND METHOD FOR COUPLING A USER COMPUTING DEVICE AND A POINT OF SALE DEVICE

CROSS-REFERENCE TO RELATED APPLICATIONS

This application is a continuation of U.S. application Ser. No. 16/050,026 filed Jul. 31, 2018 and titled "SYSTEM AND METHOD FOR COUPLING A USER COMPUTING DEVICE AND A POINT OF SALE DEVICE", which is a continuation of U.S. application Ser. No. 14/098,318 filed Dec. 5, 2013, now U.S. Pat. No. 10,068,276 and titled "SYSTEM AND METHOD FOR COUPLING A MOBILE DEVICE AND POINT OF SALE DEVICE TO TRANSMIT MOBILE SHOPPING CART AND PROVIDE SHOPPING RECOMMENDATIONS," all of which are incorporated herein by reference in their entirety

BACKGROUND

A busy shopper may have a large number of items to pick up. Upon arrival at a point of sale many customers have had the unpleasant experience of realizing that a needed item is not in the customer's cart or was not purchased during a weekly shopping trip. Remedying this situation is inconvenient for all. A cashier may simply wait while the customer goes to retrieve the item. This increases the time the customer requires to checkout. Other customers in line may become particularly frustrated if made to wait. The cashier might simply conclude the transaction for the retrieved items, requiring the customer to retrieve the item and then wait in line again to purchase the unretrieved item. This creates additional inconvenience inasmuch as the purchase of previously purchased items may need to be verified by the cashier when processing payment for the previously unretrieved item. A customer may be further inconvenienced by arriving home only to realize that a needed item was not purchased.

The systems and methods described herein provide an improved approach for assisting a customer in purchasing needed items.

BRIEF DESCRIPTION OF THE DRAWINGS

In order that the advantages of the invention will be readily understood, a more particular description of the invention will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
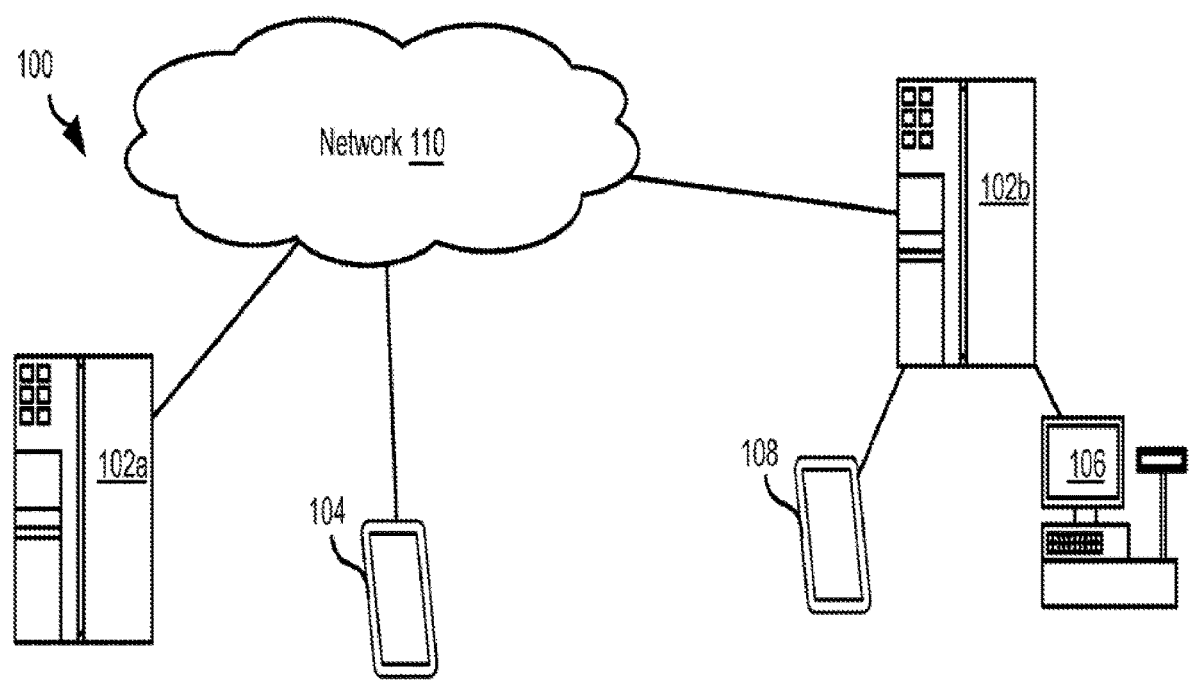
FIG. 1 is a schematic block diagram of a system suitable for performing methods in accordance with embodiments of the invention.

It will be readily understood that the components of the invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

Embodiments in accordance with the invention may be embodied as an apparatus, method, or computer program product. Accordingly, the invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The embodiments disclosed herein may advantageously be implemented using a Java language and runtime environment or a Node.js implementation. In particular, functionality implemented on a server may be implementing using one or both of these methods.

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Embodiments can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

FIG. 1 illustrates a system 100 in which methods described hereinbelow may be implemented. The system 100 may include a server system 102a that may be embodied as one or more server computers each including one or more processors that are in data communication with one another. The server system 102a may be in data communication with one or more customer computers 104 and one or more point of sale (POS) devices 106. In the methods disclosed herein, a customer computer 104 is advantageously a mobile device such as a mobile phone or tablet computer. As known in the art, many mobile phones and tablet computers also include cameras that can be used to scan optical codes such as barcodes, two-dimensional bar codes (e.g. quick response (QR) codes), or textual information. In some embodiments, some or all of the methods disclosed herein may be performed using a desktop computer or any other computing device as the customer computer 104. For purposes of this disclosure, discussion of communication with a user or entity or activity performed by the user or entity may be interpreted as communication with a computer 104 associated with the user or entity or activity taking place on a computer associated with the user or entity. A POS 106 may be located within a store and may be part of a POS network. In some embodiments, a POS 106 may be operable to process online transactions. In some embodiments, separate computers of the server system 102a may handle communication with the customer computers 104 and POS 106.

In some embodiments, a server system 102a is a global server system 102a owned or controlled by a merchant operating multiple stores, such as over a large geographic area. Individual stores or groups of stores may have their own local server systems 102b that store or access data that is unique to a particular store or to stores in a particular region. In such embodiments, the local server system 102b may likewise be in data communication with the POS 106 associated with the server system 102b, such as the POS 106 of a store or stores in a region. In some embodiments, the server system 102b may be in data communication with representative computing device 108 that is carried or otherwise accessible by a store representative.

The server system 102b may communicate with the POS 106 and representative computing device 108 by means of a local network, such as a local wireless or wired network. The server system 102a may likewise communicate with the server 102b such as by means of a network 110. The network 110 may be embodied as a peer-to-peer wireless connection between devices, a connection through a local area network (LAN), WiFi network, the Internet, or any other communication medium or system. The user computing device 104 may likewise communicate with the server system 102a or 102b by means of the network 110. In some embodiments, the user computing device 104 communicates with one or both of the POS 106 and server 102b by way of the server system 102a in order to implement the methods disclosed herein. In other embodiments, the user computing device 104 communicates directly with these devices by means of a network such as a network local to a store or the network 110.

Figure 2:
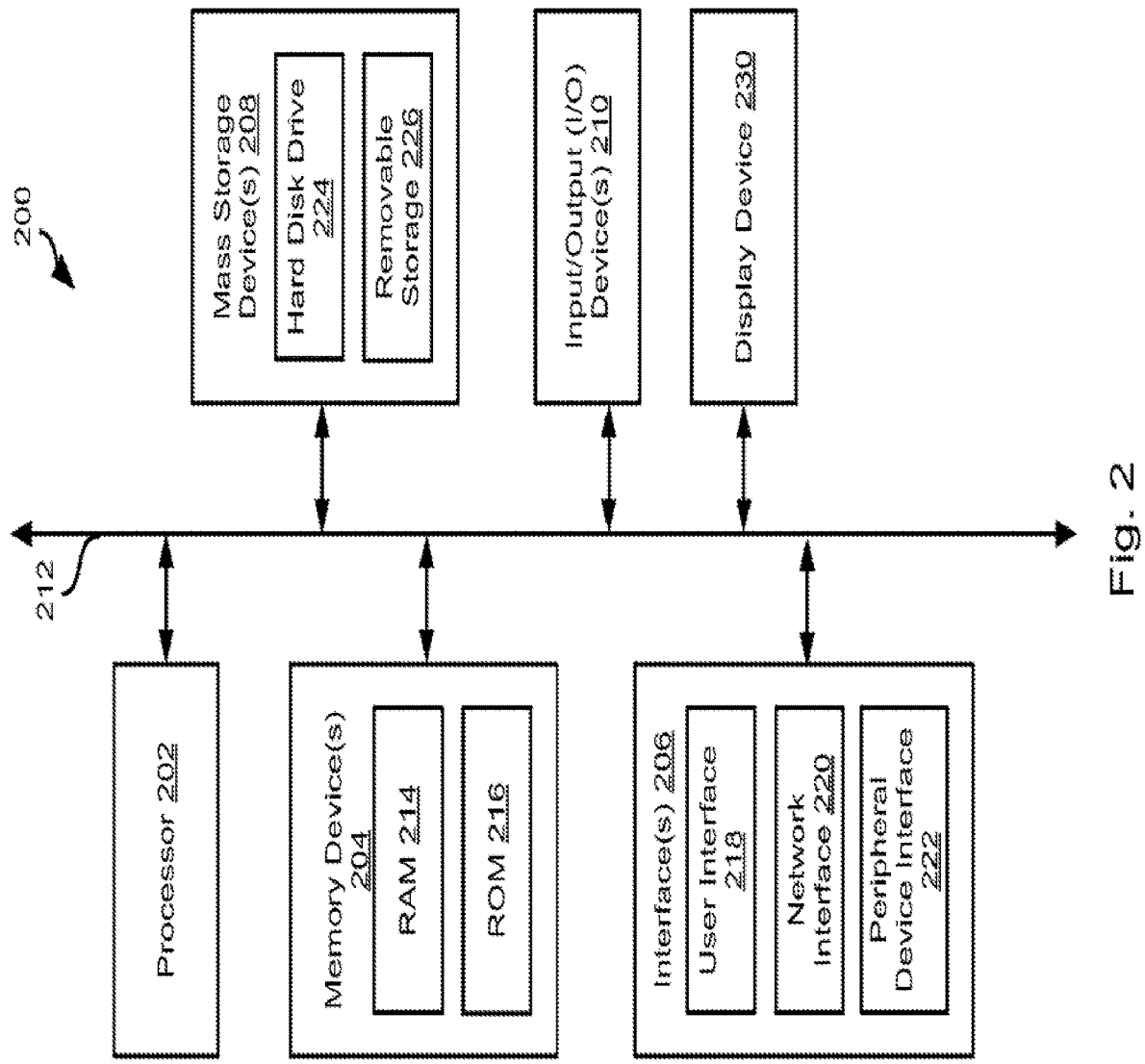
FIG. 2 is a block diagram of a computing device suitable for implementing embodiments of the invention.

FIG. 2 is a block diagram illustrating an example computing device 200. Computing device 200 may be used to perform various procedures, such as those discussed herein. A server system 102a, 102b, customer device 104, POS 106, and representative computing device 108 may include some or all of the attributes of the computing device 200. Computing device 200 can function as a server, a client, or any other computing entity. Computing device can perform various monitoring functions as discussed herein, and can execute one or more application programs, such as the application programs described herein. Computing device 200 can be any of a wide variety of computing devices, such as a desktop computer, a notebook computer, a server computer, a handheld computer, tablet computer and the like.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more user interface elements 218. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, and I/O device(s) 210 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3A:
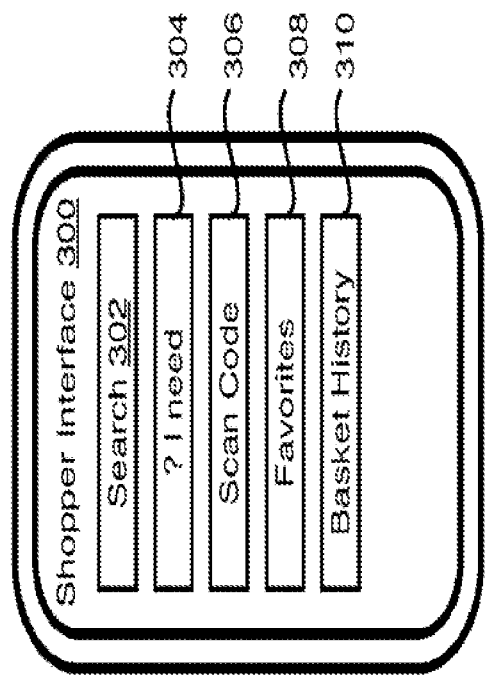
FIGS. 3A and 3B are diagrams of interfaces displayable on a user computing device and suitable for use in accordance with embodiments of the invention.

FIG. 3A illustrates an interface 300 that may be presented on a user computing device 104, such as a user computing device 104 embodied as a mobile phone or tablet computer. The interface 300 may include an interface element 302 for receiving search terms and invoking a search of a product database, such as a product database hosted by a server system 102a, 102b. An "I need" interface element 304 may invoke functionality according to the methods described herein for providing a recommendations to a user. A "scan code" interface element 306 may invoke an interface and functionality enabling a user to scan a UPC, QR, or other optical code affixed to or otherwise identifying a product. A "favorites" user interface element 308 may list a selection of frequently purchased products or products designated by a customer as a favorite. A "basket history" interface element 310 may invoke display of items recently purchased by a customer. In addition to the functionality represented by the interface 300, the methods disclosed herein for providing recommendations may generate listings of products that may be used by a user to invoke any ecommerce method or provision of enhanced information or functionality known in the art with respect to a product in the listing.

Figure 3B:
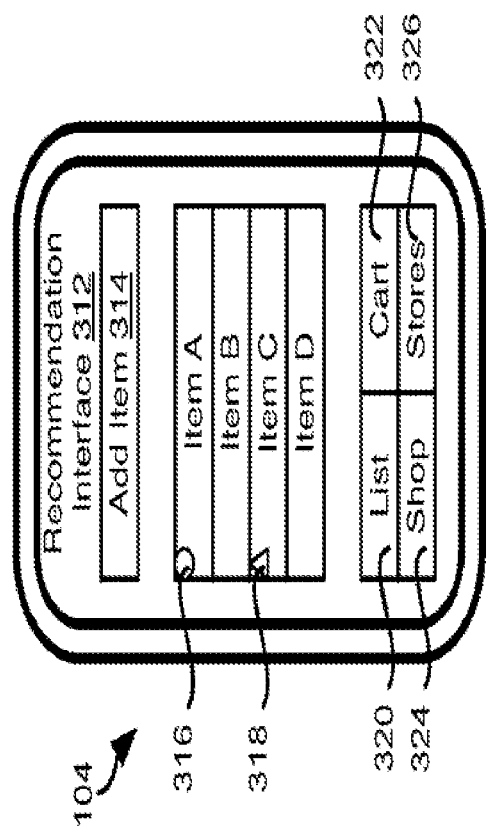

FIG. 3B illustrates a recommendation interface 312 that may be displayed in response to user selection of the "I need" interface element 304. Alternatively or additionally, as shown by the "add item" interface element 314, the interface 312 may be displayed in response to user selection of an interface element in any other interface that may be used to add an item to an electronic shopping list, such as a browser for searching and adding products to a shopping list or electronic shopping cart or other application or interface for viewing or selecting products.

The interface 312 may include a listing of products (Item A-Item D) identified and ordered according to the methods described herein. A listing of products may be too long to display all at the same time. Accordingly, the interface 312 may include interface elements enabling a user to invoke scrolling through the listing of products.

A first portion of the elements of the listing may include validation indicators 316. A second portion of the elements of the listing may include alternative indicators 318. The validation indicators 316 indicate that the product marked with a validation indicator 316 is a good choice among possible alternatives based on some criteria, such as price, nutritional value, calories, or the like. An alternative indicator 308 may indicate that the product with which it is associated is not the best choice among possible alternatives based on the same or different criteria. By selecting one of the alternative indicators 318 and the element (e.g. "Item C") with which it is associated, a user may invoke display of the better alternatives, which may include a comparison showing the original element as well as one or more alternatives and the values for the one or more criteria.

The recommendation interface 312 may further include interface elements 320-326 for invoking one or more other functions to facilitate a user's shopping. For example, interface element 320 may invoke display of an interface for displaying and modifying a shopping list. Element 322 may invoke display of an interface for displaying and modifying an electronic shopping cart. Element 324 may invoke display of an interface for browsing a product catalog or performing other product related "shopping" activities. Element 326 may invoke display of an interface for locating nearby stores.

Figure 4:
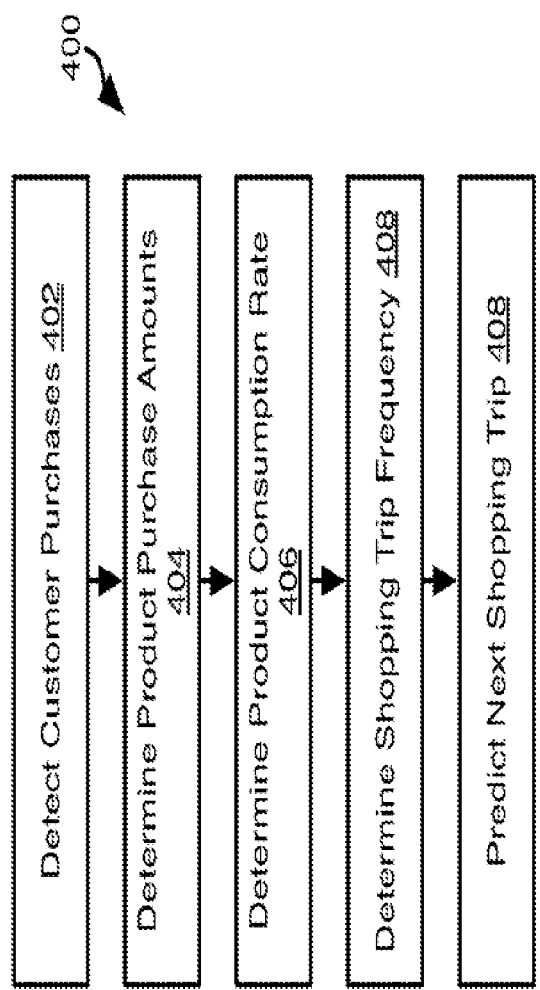
FIG. 4 is a process flow diagram for characterizing a customer's purchases in accordance with an embodiment of the present invention.

FIG. 4 illustrates a method 400 for characterizing a customer's transactions to facilitate processing according to the methods disclosed herein. The method 400 may be executed by a server system 102a, 102b. Some or all of the processing for implementing the method 400 may also be performed on a user computing device 104. The method 400 may include detecting 402 customer purchases. Purchases may be reported by a POS 106 to a server system 102a, 102b. Purchases may be associated with a particular consumer by the consumer reporting a consumer identifier to the POS 106 at the time a transaction is concluded. This customer identifier may be associated with a report of the transaction reported to the server system 102*a* and the server system 102*a* may store a report of the transaction, or some or all of the information therein, in association with that customer, such as by means of the same or a different customer identifier. Alternatively or additionally, reports of customer purchases may be reported by the customer. For example, the customer could enter purchases into an interface that submits a report of such purchases with a customer identifier to the server system 102*a*. Alternatively or additionally, reports of the consumer identifier may be transmitted to a POS 106 by a mobile device 104 with contents of an electronic shopping cart as part of a mobile self checkout routine whereby the user assembles an electronic shopping cart with items, the device 104 is paired with the POS 106, and the device 104 transmits the shopping cart to the POS 106 for concluding the transaction. The customer identifier may be transmitted to the POS 106 for association with a transaction as part of other types of transactions.

The method 400 may further include evaluating customer transactions in order to determine amounts of products purchased and when. In particular, product A may be represented among transactions. The user may have purchases 10 units of product A, then purchase 15 units three weeks later, and then purchase 5 units five weeks after that. Using this information, the method 400 may include determining 406 a consumption rate. For example, using the above example, the consumer may be determined to consume 10 units of product A every month. In general, a consumption rate may be determined by the ratio P/W, here P is the number of products purchased in a time window and W is the length of the window.

The method 400 may further include determining a shopping trip frequency based on the detected transactions, e.g. the average time elapsed between transactions. The method may further include predicting 408 a next shopping trip for the customer based on the shopping trip frequency. In some embodiments, the methods disclosed herein may be performed while the customer is in a store or otherwise in the process of going shopping on the day the methods are performed. Accordingly, predicting the next shopping trip may include predicting a next shopping trip after the current day on which the methods disclosed herein are executed, taking into account that the current day is a shopping trip. Predicting when the next shopping trip will be may include adding the shopping trip period to the current date (e.g. if the frequency is every N days, add N days to the current date to fine the predicted next shopping trip).

Figure 5:
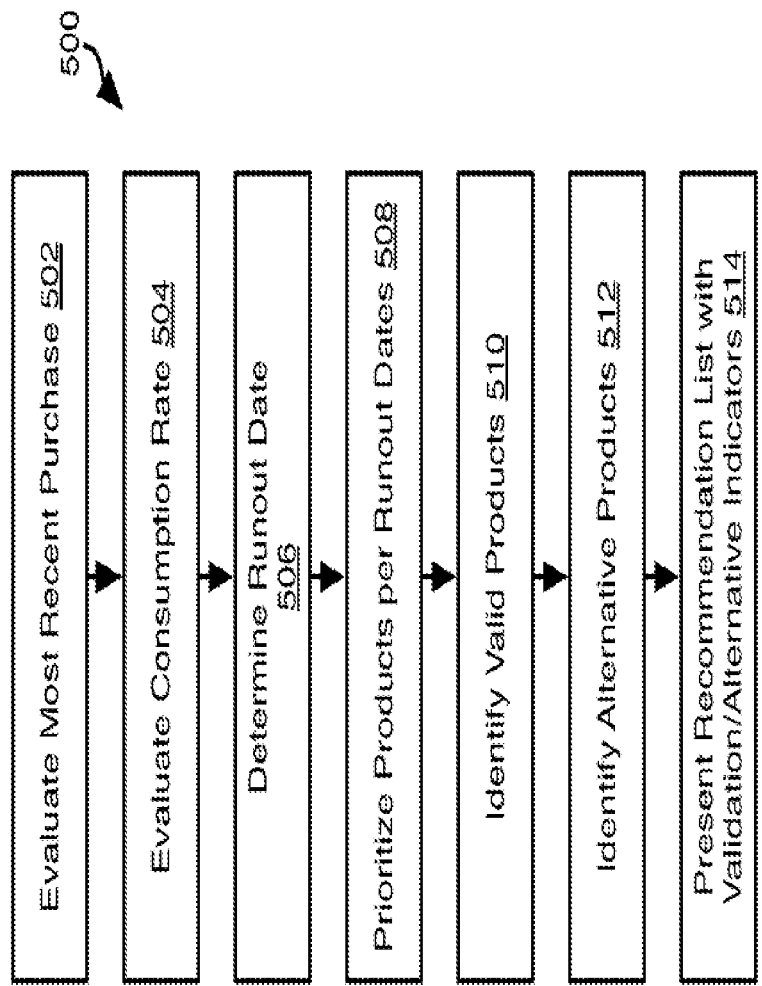
FIG. 5 is a process flow diagram of a method for providing a recommendation list in accordance with an embodiment of the present invention.

FIG. 5 illustrates a method 500 for providing product recommendations. The method 500 may be performed using data generated according to the method 400. The method 500 may include evaluating 502 a customer's most recent purchases 502 of a plurality of products and evaluating 504 a consumption rate of the customer for those products. Based on the evaluations 502, 504, the method 504 may include determining 506 a runout date. For example, where X is the most recently purchased amount of product A and R is a consumption rate (units of product per unit time), the runout date may therefore be A/R after the date of the most recent purchase of product A. Other algorithms may also be used.

The method 500 may further include prioritizing 508 products according to runout dates. For example, products with the soonest predicted runout date may be given higher priority. In some embodiments, prioritizing 508 may include filtering products using a predicted date for a next shopping trip. For example, those products that have runout dates after a next shopping trip may be omitted. In particular, where the method 400 is executed in preparation for a current shopping trip and the predicted shopping trip date is for a next shopping trip subsequent to the current shopping trip. Products that are rarely purchased or for which no pattern of repeated purchase is found may also be omitted from the prioritizing.

The method 500 may further include identifying valid products from among the plurality of products. Valid products may include products that meet one or more criteria, or are better than alternatives with respect to the one or more criteria. For example, a valid product may be a product that has the lowest per unit cost than alternative products, e.g., the cheapest per ounce, gram, piece, or the like. Alternatively, a criteria may relate to quality, such as according to a ranking by a publication, rankings by users who have reviewed the product, or some other metric. In yet another alternative, a score may be assigned to a product based on a plurality of such criteria (e.g. sum, weighted sum, product, weighted product, or some other combination), and a valid product may be one that has the highest score among a group of alternative products. In some embodiments, rather than being the highest rated according to a criteria or combination of criteria, a valid product may be one of the top N products according to a criteria or combination of criteria or meet a threshold condition with respect to a criteria or combination of criteria. Products found to be valid may be marked with a validity indicator 316 as shown in FIG. 3B when a listing of products is displayed to a user. Accordingly, a listing transmitted to a user device 104 may have an indication of validity associated therewith.

The method 500 may further include identifying 512 alternative products. In particular, where a product is found not to be valid, one or more alternative products may be identified. In some instances, no alternative, or clearly superior alternative, may be found. However, if a superior alternative exists, such as according to a criteria or combination of criteria as discussed above, one or more of such superior alternatives may be identified. If an alternative is found for a product, then an indication of an alternative may be associated with that product in a listing of products sent to a user device and used to display an alternative indicator 318 with a reference to the at product. The identified one or more alternatives may also be transmitted with the listing or transmitted in response to a user interaction with the alternative indicator 318 or a representation of the product with which it is associated. An alternative product may be transmitted as an identifier for the alternative product as well as values for the criteria or combination of criteria used to determine that the alternative product is superior.

The method 500 may further include presenting 514 a recommendation list including a listing of the products as ordered according to the prioritization as well as any validation or alternative indicators. Presenting the listing may include transmitting sufficient information to the user device 104 to enable the user device to visually represent the listing and otherwise enable a user to navigate and interact with the listing, such as discussed above with respect to FIG. 3B.

Figure 6:
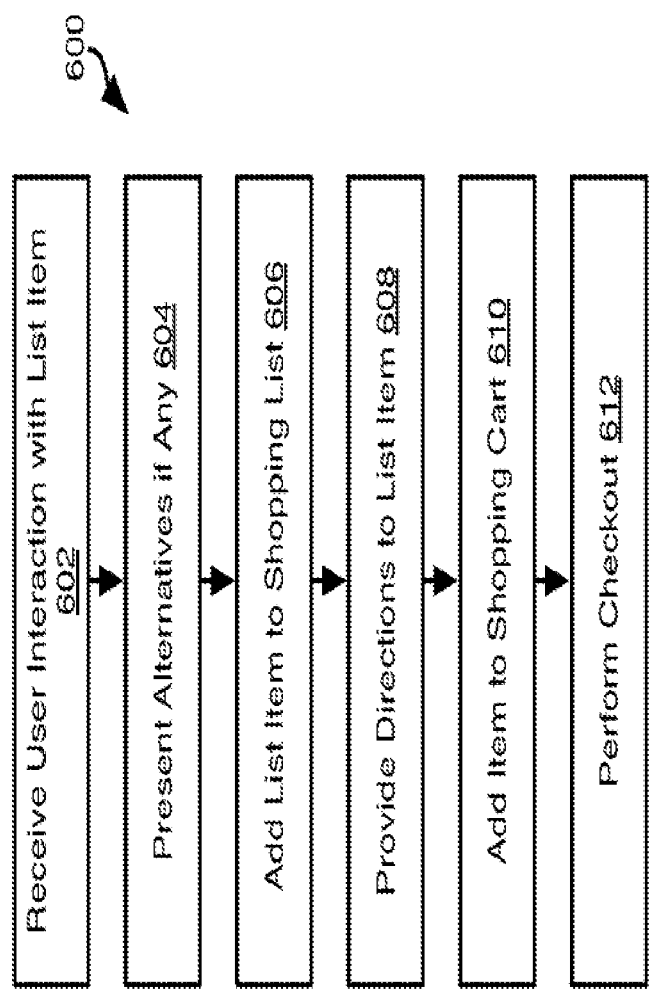
FIG. 6 is a process flow diagram of a method for performing shopping activities with respect to a recommendation list in accordance with an embodiment of the present invention.

FIG. 6 illustrates a method 600 for using a listing of products as generated according to the method 500 to invoke other functionality to facilitate shopping by a customer. The method 600 may be executed on a server system 102*a* with an interface provided on a user device 104 and some or all of the processing may also occur on the user device 104.

The method 600 may include receiving 602 user interaction with an item of a list displayed on the user device, the list including items that have been one or more of selected, prioritized, and marked with indicators according to methods disclosed herein.

The method 600 may include presenting 604 one or more alternatives, if any associated with the selected item. A user may then select one of these alternatives to add the alternative to a shopping list, shopping cart, or otherwise obtain information or begin a process of purchasing or locating the alternative. As noted above, presenting 604 alternatives may include presenting values for criteria used to select the alternative or that otherwise indicate the superiority of the alternative to an item of the list.

The method 600 may further include adding 606 the list item to a shopping list in response to an instruction from a user received on the user device. The shopping list may be an electronic shopping list and may be displayable in an interface for invoking one or more actions with respect to the shopping list. For example, the method 600 may include providing 608 directions to a list item such as by calculating a route through a store with respect to a shopping list. The method 600 may include adding 610 the list item to a shopping cart of items to be purchased. This may include adding 610 the list item to an electronic shopping cart in response to a user scanning a code affixed or otherwise associated with an instance of the list item. Adding 610 the item to the list may also be performed as part of adding an entire shopping list to the electronic shopping cart in response to an instruction from a user.

The method 600 may further include performing 612 checkout for the list item using the user computing device. Performing 612 checkout may include performing checkout with respect to an electronic shopping cart including the list item. Performing 612 checkout may include performing mobile self checkout in cooperation with a POS 106. For example, a POS 106 may receive a request to use mobile self checkout (MSCO). This may be communicated verbally to a cashier who then inputs or otherwise specifies the MSCO option to the POS 106. In response to receipt of this instruction, the POS 106, may generate and display a code that is used to couple a particular user computing device 104 to that POS 106. The displayed code may be a one-off code that is generated for each transaction or otherwise used for only one transaction.

The user computing device 104 scans the displayed coupling code. The user computing device then transmits the contents of the electronic cart to the POS 106 using the coupling code. This coupling code may be an address that can be used to transmit the contents of the electronic shopping cart directly to the POS 106. Alternatively, the contents of the cart with the coupling code may be transmitted with the coupling code to a server system 102a, 102b. The server system 102a, 102b may then interpret the coupling code to identify the POS 106 that generated the coupling code and transmit the contents of the electronic shopping cart to this POS 106.

The contents of the electronic shopping cart received by the POS 106a may then be used to conclude 814 the transaction on the POS 106a. The items received by the POS 106 may, for example, may treated in the same manner as items input to the POS 106 by scanning bar codes in the conventional manner. Likewise, concluding the transaction may include receiving tender of cash, check, or electronic payment, as for the typical in-store transaction. Other methods known in the art for concluding a transaction for an electronic shopping cart input to a user computing device 104 may also be performed. Likewise, items may simply be added to a physical shopping cart. A user may check off items from a shopping list as they are added to the physical shopping cart. A transaction to purchase the items may be concluded at a POS 106 in the conventional manner.

The invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A purchase system comprising one or more processors and one or more memory devices operably coupled to the one or more processors, the one or more memory devices storing executable and operational data effective to cause the one or more processors to:
  receive, at a point of sale device associated with a store, a request to use self-checkout through a user computing device;
  couple the point of sale device with the user computing device by:
    display by the point of sale device a coupling code configured to be scanned by the user computing device;
    receive the coupling code by a server system associated with the store; and
    interpret, at the server system associated with the store, the coupling code to identify the point of sale device;
  cause contents of an electronic shopping cart associated with a transaction to be transmitted to the identified point of sale device in response to identifying from the coupling code the point of sale device;
  receive a customer identifier associated with the transaction; and
  conclude, on the point of sale device, the transaction associated with the contents of the electronic shopping cart based on the coupling of the point of sale device with the user computing device that is associated with the customer identifier.

2. The system of claim 1, wherein the server system is configured to receive, from the user computing device, the coupling code in response to the scanning of the coupling code by the user computing device.

3. The system of claim 2, wherein the server system is configured to receive, from the user computing device in response to the scanning of the coupling code by the user computing device, the contents of the electronic shopping cart associated with the transaction, and further configured to transmits the contents of the electronic shopping cart to the point of sale device.

4. The system of claim 1, wherein the point of sale device is configured to receive a manual activation of a self checkout option of the point of sale device, generate the coupling code and display the coupling code in response to the manual activation of the self check out option.

5. The system of claim 1, wherein the point of sale device is configured to receive the customer identifier and the contents of the electronic shopping cart transmitted from the user computing device as part of a self checkout routine in response to the coupling of the point of sale device with the user computing device.

6. The system of claim 1, wherein the point of sale device is configured to generate the coupling code as a one-off code unique to the transaction.

7. The system of claim 1, wherein the server system is further configured to transmit the contents of the electronic shopping cart associated with the transaction from the server system to the identified point of sale device in response to the identification, by the server system, of the point of sale device from the coupling code.

8. The system of claim 1, wherein the server system is configured to identify a plurality of products having an expected runout date prior to a next expected transaction associated with the customer identifier.

9. The system of claim 8, wherein the executable and operational data is further effective to cause the one or more processors to:
determine a prioritization of at least a portion of the plurality of products according to the runout dates thereof; and
transmit to the user computing device a listing of the plurality of products according to the prioritization.

10. The system of claim 9, wherein the server system is configured to identify, for each product of the plurality of products, at least one alternative product, wherein the transmitting the listing comprises transmitting the listing including the at least one alternative product of each product of the plurality of products.

11. A method to enable purchasing comprising:
one or more processors and one or more memory devices operably coupled to the one or more processors, the one or more memory devices storing executable and operational data effective to cause the one or more processors to:
receiving, at a point of sale device associated with a store, a request to use self-checkout through a user computing device;
coupling the point of sale device with the user computing device by:
  displaying by the point of sale device a coupling code configured to be scanned by the user computing device;
  receiving the coupling code by a server system associated with the store; and
  interpreting, at the server system associated with the store, the coupling code to identify the point of sale device;
causing the contents of an electronic shopping cart associated with a transaction to be transmitted to the identified point of sale device in response to identifying from the coupling code the point of sale device;
receiving a customer identifier associated with the transaction; and
concluding, on the point of sale device, the transaction associated with the contents of the electronic shopping cart based on the coupling of the point of sale device with the user computing device that is associated with the customer identifier.

12. The method of claim 11, further comprising:
receiving, at the server system and from the user computing device, the coupling code in response to the scanning of the coupling code by the user computing device.

13. The method of claim 12, further comprising:
receiving, at the server system and from the user computing device in response to the scanning of the coupling code by the user computing device, the contents of the electronic shopping cart associated with the transaction, and transmitting the contents of the electronic shopping cart to the point of sale device.

14. The method of claim 11, further comprising:
receiving, at the point of sale device, a manual activation of a self checkout option of the point of sale device, generating the coupling code and displaying the coupling code in response to the manual activation of the self check out option.

15. The method of claim 11, further comprising:
receiving, at the point of sale device, the customer identifier and the contents of the electronic shopping cart transmitted from the user computing device as part of a self checkout routine in response to the coupling of the point of sale device with the user computing device.

16. The method of claim 11, further comprising:
generating, by the point of sale device, the coupling code as a one-off code unique to the transaction.

17. The method of claim 11, further comprising:
transmitting, by the server system, the contents of the electronic shopping cart associated with the transaction to the identified point of sale device in response to the identification, by the server system, of the point of sale device from the coupling code.

18. The method of claim 11, further comprising:
identifying, by the server system, a plurality of products having an expected runout date prior to a next expected transaction associated with the customer identifier.

19. The method of claim 18, further comprising:
determining a prioritization of at least a portion of the plurality of products according to the runout dates thereof;
identifying, for each product of the plurality of products, at least one alternative product; and
transmitting to the user computing device a listing of the plurality of products according to the prioritization and the at least one alternative product of each product of the plurality of products.

20. A system comprising one or more processors and one or more memory devices operably coupled to the one or more processors, the one or more memory devices storing executable and operational data effective to cause the one or more processors to:
receive, at a first electronic device, a request to use self-checkout through a second electronic device;
couple the first electronic device with the second electronic device by:
  displaying at the first electronic device a coupling code configured to be scanned by the second electronic device; and
  interpreting the coupling code to identify the first electronic device;
cause contents of an electronic shopping cart associated with a transaction to be transmitted to the first electronic device in response to identifying from the coupling code the first electronic device;
receive a customer identifier associated with the transaction; and
conclude, on the first electronic device, the transaction associated with the contents of the electronic shopping cart based on the coupling of the first electronic device with the second electronic device that is associated with the customer identifier.

* * * * *